United States Patent [19]

Reuss et al.

[11] Patent Number: 5,393,121
[45] Date of Patent: Feb. 28, 1995

[54] SWIVEL MOUNTING FOR VEHICLE FRONT SEATS

[75] Inventors: Thomas Reuss, Bergish-Gladbach; Gerhard Schmale, Huckeswagen; Norbert Sommer, Wermelskirchen; Martin Lynda, Remscheid DE, all of Germany

[73] Assignee: Naue/Johnson Controls Engineering GmbH & Co., KG, Germany

[21] Appl. No.: 45,569

[22] Filed: Apr. 9, 1993

[30] Foreign Application Priority Data

Apr. 15, 1992 [DE] Germany ............................ 4212589

[51] Int. Cl.⁶ .......................... B60N 2/12; B60N 2/06; B60N 2/10
[52] U.S. Cl. ................................ 297/329; 297/344.1; 297/334; 296/65.1
[58] Field of Search ...................... 297/329, 344.1, 325, 297/334, 331; 296/65.1

[56] References Cited

U.S. PATENT DOCUMENTS

| 1,371,848 | 3/1921 | Brooks | 297/334 |
|---|---|---|---|
| 2,270,172 | 1/1942 | Ruegger | 297/329 |
| 2,598,384 | 5/1952 | Huber | 297/329 |
| 2,921,621 | 1/1960 | Williams | 296/65.1 |
| 4,648,655 | 3/1987 | Moorhouse | 297/331 |
| 4,696,508 | 9/1987 | Brautigam | 297/344.1 |

FOREIGN PATENT DOCUMENTS

| 0289468 | 11/1988 | European Pat. Off. | |
| 1181451 | 6/1959 | France. | |
| 2453732 | 5/1976 | Germany. | |
| 0015028 | 1/1982 | Japan | 296/65.1 |
| 0104425 | 1/1982 | Japan | 296/65.1 |
| 0008128 | 1/1985 | Japan | 297/344.1 |
| 596063 | 12/1947 | United Kingdom | 297/344.1 |

*Primary Examiner*—Kenneth J. Dorner
*Assistant Examiner*—David E. Allred
*Attorney, Agent, or Firm*—Leonard J. Kalinowski; E. L. Levine; Joseph E. Root, III

[57] ABSTRACT

A tilt-away system for front seats of vehicles for permitting the entire front seat to be moved as far as possible out of the entry and exit region of the vehicle includes a seat frame front support assembly including a support stand which supports the front portion of the seat frame, a seat frame rear support assembly including link arms on each side of the seat frame, the link arms having forward ends pivotally secured to travellers which are displaceably mounted in rails and rearward ends connected to the rearward portion of the seat frame and being locked in a use position for the seat by a link arm locking mechanism, the link arms being adapted to be pivoted forwardly and upwardly to tilt the seat forwardly after it has been moved forwardly on the rails to a position intermediate the use and access positions, and a release mechanism for releasing the front portion of the seat frame from the support stand and the link arm locking mechanism in one operation so that the front seat can be moved forward to the intermediate position and then tilted forwardly and upwardly to the access position.

7 Claims, 6 Drawing Sheets

SWIVEL MOUNTING FOR VEHICLE FRONT SEATS

BACKGROUND OF THE INVENTION

It is known to tilt the backrests of the front seats of two-door passenger cars right forward, possibly as far as the seat, to enable persons to get into and out of the back seats, and if necessary to move the whole seat forward by means of the adjusting means. However, this operation requires considerable effort, since the seat and the backrest also have to be moved back into the desired position.

In addition, the distance the seat can be moved forward is generally too short for comfort in getting into and out of the back seats. It generally amounts to about 200 mm, and cannot be increased because the seats can only be moved forward parallel to the floor. In the case of two-door vehicles space for getting in and out is above all particularly limited in the foot region. To increase the amount of travel the lower outer adjusting rails would have to be made longer, but as metal parts they would then be felt to get in the way of the feet of the persons seated both in the front and in the back.

This is generally remedied by extending the doors of such two-door vehicles farther back, in the interest of improved access to the back seats, than would be necessary only for access to the back seats. However, this object is only partly achieved, since limits are set to the increase in size of these doors on grounds of manufacture, strength and appearance. If, as is generally the case, there is a choice of availability of a particular type of vehicle with either two or four doors, there is the further disadvantage that two different front doors have to be manufactured for the same basic model, with corresponding differences in the bodywork, which increases the expense.

The invention aims to solve the problem of enabling the seats, preferably so-called three-legged seats, of a two-door passenger car with two rows of seating to be moved in a simple manner so far forward that getting into and out of the back seats is facilitated by larger clearances even without increasing the door size, so that there is enough room, particularly in the foot region, for the persons getting in and out.

Particular advantages obtained through the invention are that both getting into and out of, and also loading and unloading of, the back seats of two-door passenger cars with two rows of seating are facilitated at little cost in apparatus and operating effort without the front doors having to be made larger for the two-door version in the case of types of vehicle that are available with two or four doors, since the necessary free space is provided by the displacement of the seats by tilting in the way proposed. It is particularly beneficial that through the large forward displacement and tilting up of the front seat the space for getting into the back seats is markedly increased over the whole body region and not just for the feet. If on grounds of comfort the size of the access region of the front doors is further increased, getting into and out of the back seats of the two-door, two-row seating embodiments becomes particularly easy and the back seats are easier to load and unload.

Advantageous embodiments of the invention are set forth in the claims.

Exemplary embodiments of the invention are illustrated in the drawings and will now be described more fully.

DESCRIPTION OF PREFERRED EMBODIMENTS

Figure 1:
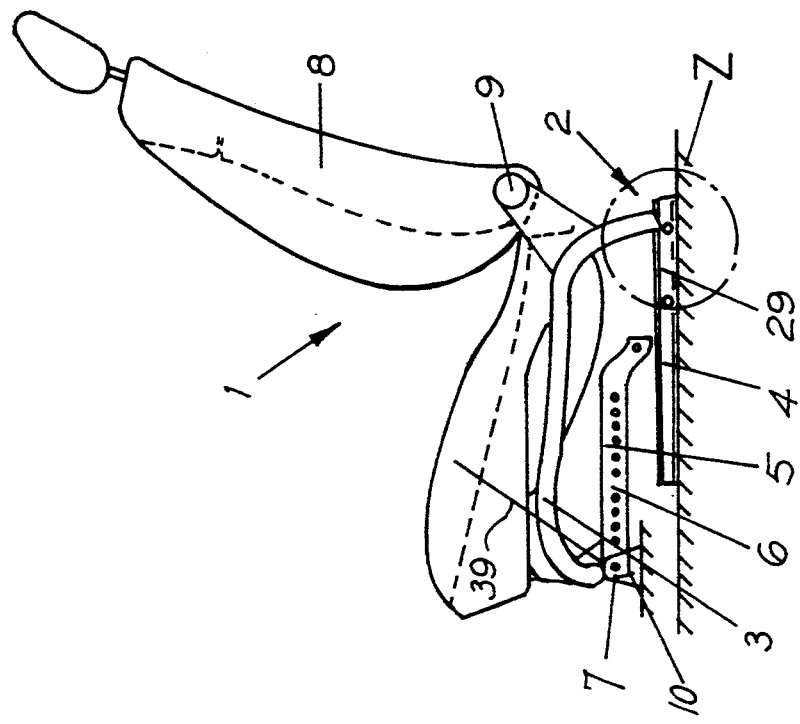
FIG. 1 shows a side view of a front seat, installed and moved right back.

A front seat 1 as shown in FIG. 1 is in the form of a so-called "three-legged seat" which is connected on both outer sides at the back in its lower region, by means of connections 2 of its frame 3, to adjusting rails 4 fitted to the vehicle floor, and in the middle in front, through an adjusting and locking rail 5 secured to the front seat 1, to a supporting and locking stand 10 in which it is slidably and pivotably mounted. For this purpose the adjusting and locking rail 5 can be a bar of suitable cross section, so that as a result of its open front it can easily be inserted into the supporting and locking stand 10. Through suitably shaped guide elements of the supporting and locking stand 10 the adjusting and locking rail 5 can be mounted for sliding longitudinally and also, within adequate limits, pivoting, in the stand 10, so that it is also supported in the same way in regions without perforations 6 (see FIG. 2). To conform to the respective spatial conditions the adjusting and locking rail 5 is bent downwards in its rear region 11, so that it does not collide with the floor in front. The front seat 1 is located axially of the vehicle and locked in the use position by means of this supporting and locking stand 10 in cooperation with a known locking means including pin 7 and perforations 6, into which the pin 7 projects.

A backrest 8 can, in known manner, be connected to the frame 3 and be adjustable in its angular position relative to the seat 1 by means of adjusting gears 9.

Figure 2:
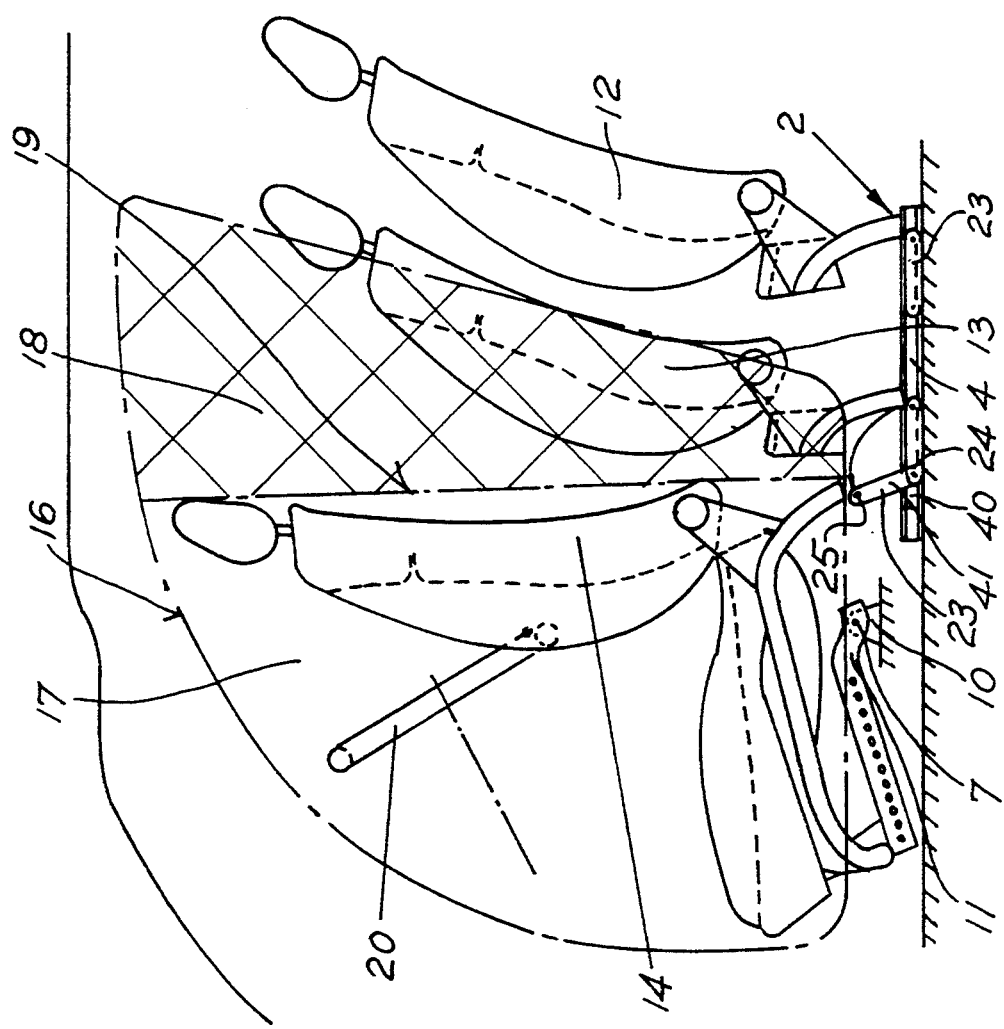
FIG. 2 shows a side view of the entry area of a two-door passenger car with the outlines of a front seat in various positions.

In FIG. 2 position 12 indicates, by showing only the rear outline of the front seat 1, a position for use by the passenger in which its backrest 8 is in the middle to rear tilting region. Position 13 shows the location of this front seat 1 when moved forward, and in position 14 the whole seat is shown tilted about the supporting and locking stand 10 relative to position 13, as is desired for getting into and out of the back seats.

A door opening 17 in the bodywork of the vehicle is bounded by the chain line 16, and the cross-hatched area 18, bounded in front by a line 19, shows the increase in the free space for getting in and out that is gained by the displacement of the front seat 1 from position 13 to position 14 according to the invention.

In position 14 the backrest 8 on the driver's side comes close to the steering wheel 20, and it can be seen that there is still room to tilt the backrest 8 further forward.

Figure 3:
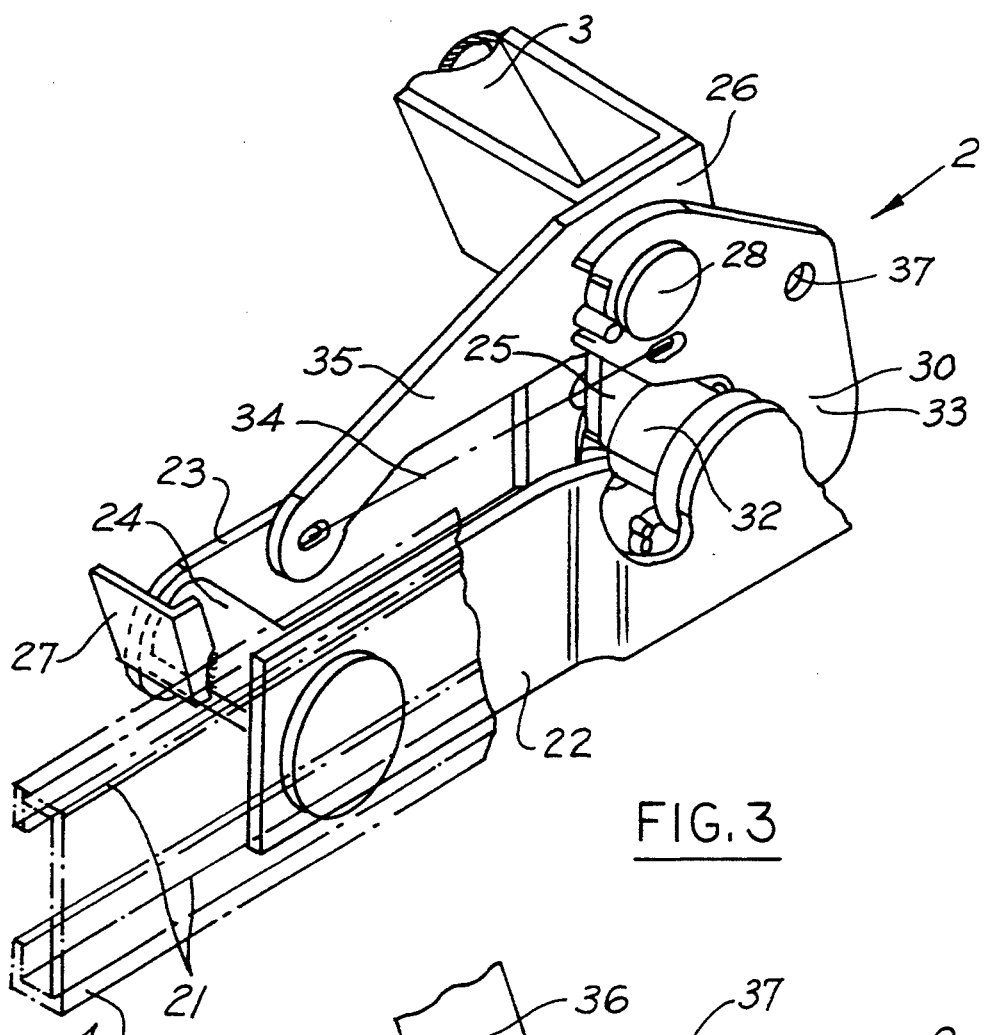
FIG. 3 shows, in enlarged perspective view, a detail indicated by "Z" in FIG. 1 of a lower, outer connection of the front seat to a linkage in the normal position of the front seat when in use.

Tilting from position 13 to position 14 is made possible by fitting the two rear connections 2 of the frame 3, of which the left-hand part is shown in detail in FIG. 3, with travellers 22 that can travel back and forth on both sides in the adjusting rails 4 that surround them. One possible section for these rails is indicated by the chain line 21.

A link arm 23 is fitted pivotably on the inner side of the traveller 22 by means of its axle 24, and has fixed to its other end a pivot pin 25 on which a bearing bracket 26 of the frame 3 (see also FIG. 4) is journalled. Also connected to the bearing bracket 26 is a pin 28 on which a hook 30 can pivot to a limited extent. When the hook is in its position 33, for use of the front seat 1, as shown in FIG. 3, it engages round a locking pin 32 fixed to the traveller 22, thus providing, together with the fixed seating part 31 of the bearing bracket 26 in said frame, a firm connection of the frame 3 to the traveller 22 and thus to the adjusting rails 4 fixed to the vehicle floor. The hook 30 is secured in its locking position 33 by a tension spring 34 having one end connected to it and the other end to an arm 35 of the bearing bracket 26.

To move and tilt the front seat 1 from position 12 into position 13 and finally into position 14 the hook 30 is pivoted into a free position 38 by an actuation transmitted through a traction element 37, and at the same time by an actuation element 39 (FIG. 1), the locking of the adjusting and locking rail 5 by the pin 7 is also released. The front seat 1 can then first be moved forward until traveller 22 meets stops 40, so that continued actuation of the forward movement of the front seat 1 immediately initiates pivoting of the link arm 23 from its lower, backward-pointing starting position 29 into an end position 41, assisted by the kinetic energy imparted to the front seat 1 and released on meeting the stop 40. The end position 41 of the link arm 23 is determined by stops 27 connected to the axle 24.

Such actuation of the locking means for the hooks 30 and for the supporting and locking stand 10 can advantageously be effected by means such as that proposed in German patent application P 41 42 924.9-16.

Figure 4:
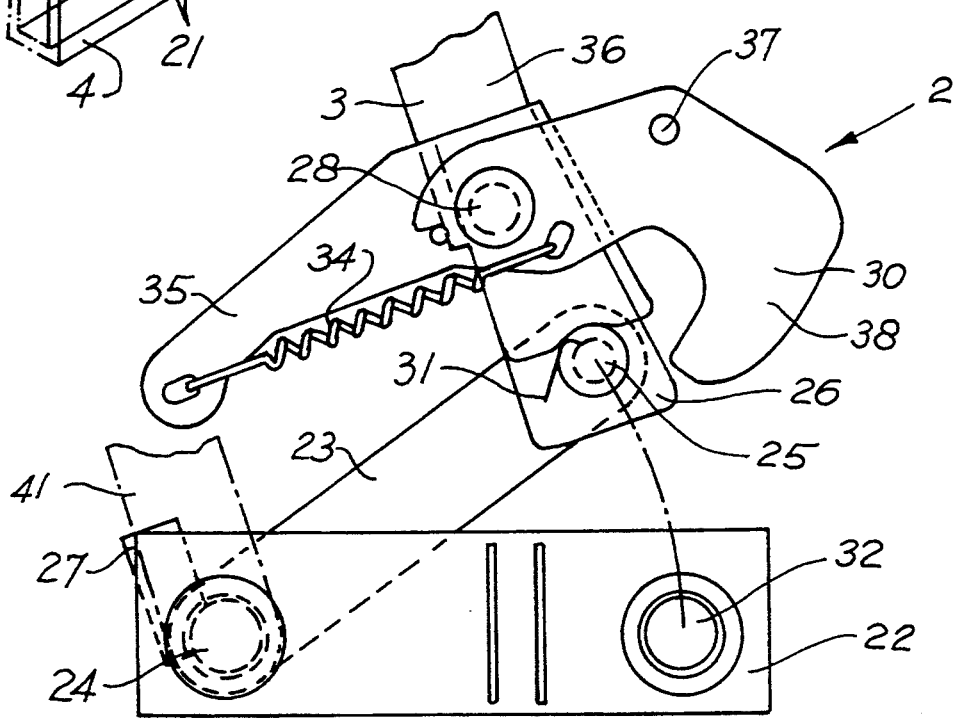
FIG. 4 shows a side view of the same linkage as in FIG. 2, in a partly tilted-up position.

In FIG. 4 the connection 2 of the frame 3 is shown in an intermediate position between the approximately horizontal starting position of the link arm 23 in the position of use of the front seat and its end position 41.

In the end position 41 (see FIG. 2) the pivot pin 25 of the link arm 23 is in front of a vertical through its lower axle 24, and this, together with the weight of the front seat 1, provides sufficient support for the seat in position 14 for the time needed for getting in and out or the like, and likewise it can conveniently be returned to the rear position for use. An additional resilient catch can also be employed in this end position.

Figure 5:
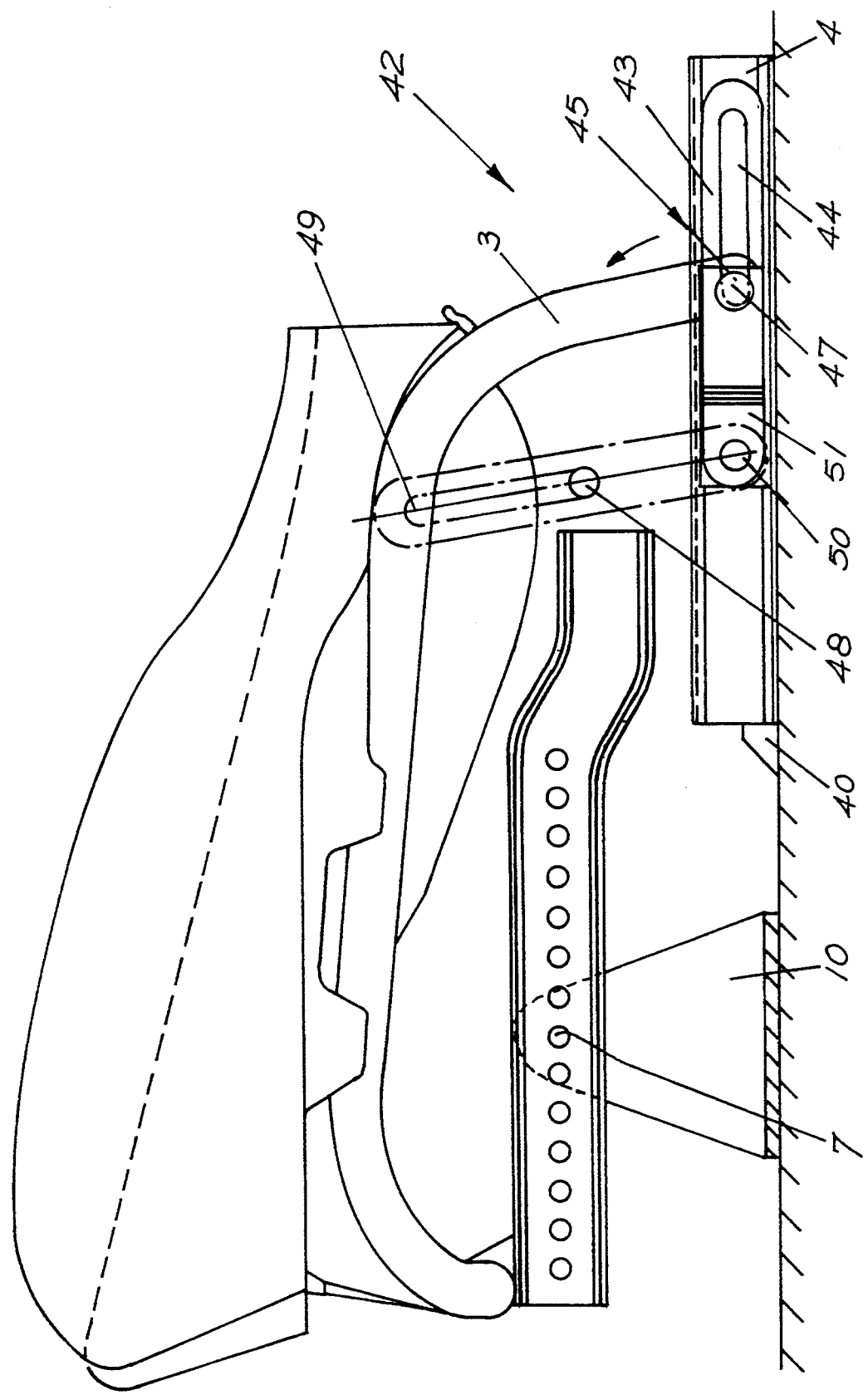
FIGS. 5 and 6 show variants of the embodiment of FIGS. 1 to 4.

A variant 42 of an adjusting and tilting system for a front seat 1 shown in FIG. 5 has connections 45 on both sides for the frame 3 in which the connecting elements employed are collar pins 47 that form pivot axles connecting the frame 3 to the link arms 43. These link arms 43 are connected through pivot axles 50 to travellers 51 mounted slidably in adjusting rails 4 and have at their other ends extension regions leading to the collar pin 47 and having slots 44 into which the supports of the frame 3 are slidably fitted by means of the collar pins 47. By this means, at the end of the first phase of the tilting up of the front seat 1 increased tilting of the front seat about the supporting and locking stand 10 can take place after reaching the position 48 by subsequent upward travel in the region of the slot 44 as far as the position 49. These positions 48 and 49 can be secured sufficiently for the full tilting by engagement of known spring catches or the like that can be overridden in operation.

In place of a link arm 43 with a slot 44 a different form of linkage could be used, e.g. a telescopic one made up of tubular parts or the like.

Figure 6:
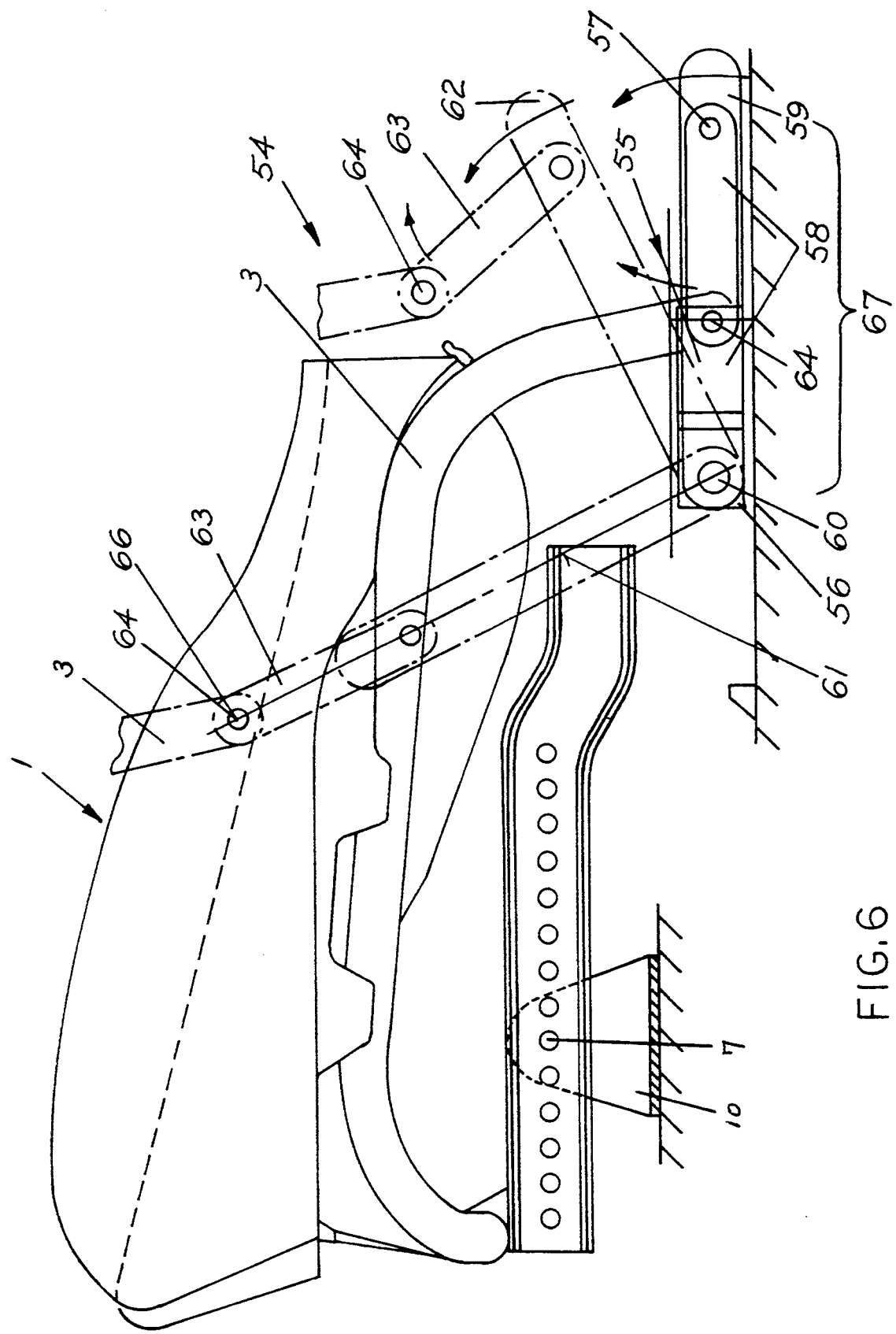

FIG. 6 shows a variant 54 of an adjusting and tilting system for a front seat in which a double link arm 58 is used to connect the frame 3 to travellers 56, making increased tilting of the front seat 1 possible. A first part 59 of the linkage is journalled on a pin 60 fitted to the traveller 56 and can be brought into the end position 61 by tilting the front seat 1. In doing so, as is shown by an intermediate position 62, a second part 63 of the linkage, fitted to the first part 59 by means of an axle 57, folds out by pivoting in the opposite sense to the first part 59 so that the pivot axle 64, and with it the frame 3, arrives at a particularly elevated position 66. The length 67 of the double linkage 58 in its lower, approximately horizontal position for the use position of the front seat 1 does not correspond to the fully extended length in position 66, and thus does not cause any trouble down below.

In the variants 42 and 54 the components such as the travellers 22, 56 or hooks 30 are used correspondingly to the embodiments shown in FIGS. 3 and 4, as are stops and locking means (not illustrated) for stabilizing the link arms 43 in their pivoted-up position and the double linkage 58 as such and in its working and raised position 66.

Figure 7:
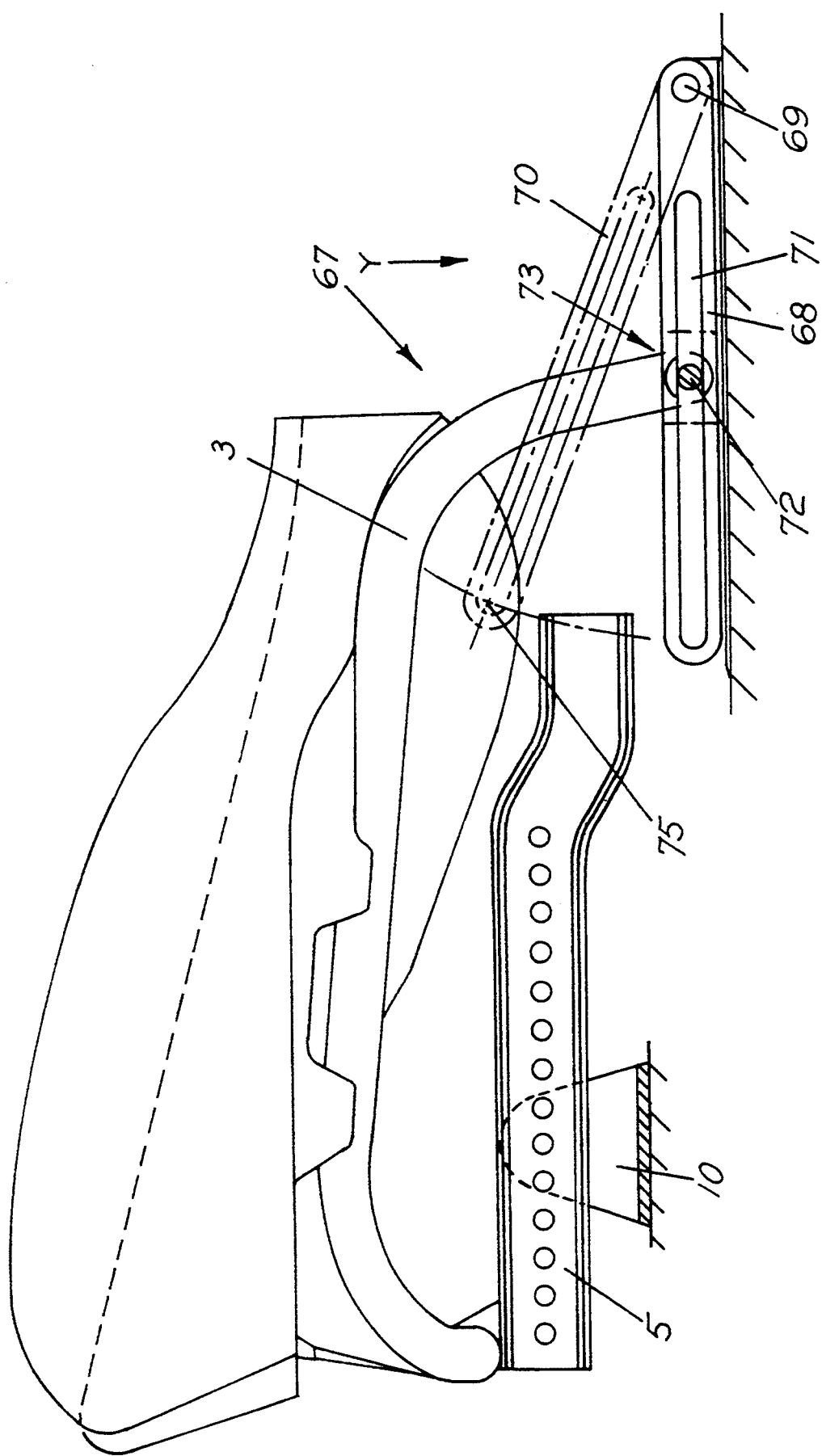
FIG. 7 shows a further variant of the subject matter of the invention, in section on the line A-B in FIG. 8.
Figure 8:
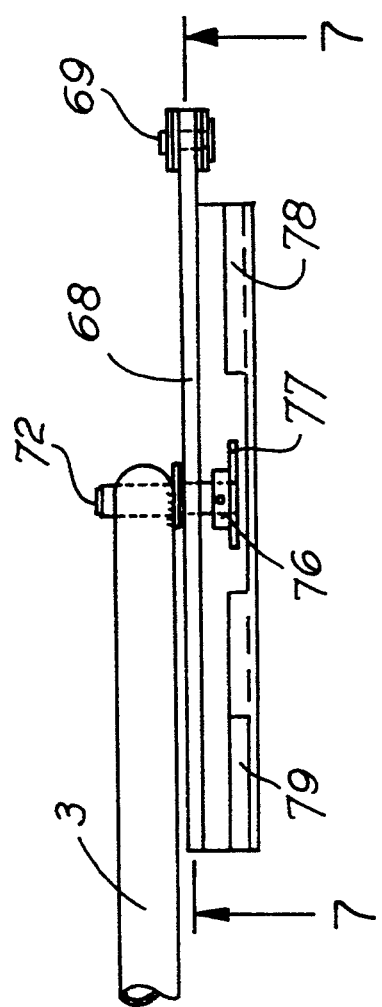
FIG. 8 shows a plan view from above in the direction of the arrow Y in FIG. 7.

In a further variant 67, shown in FIGS. 7 and 8, of the embodiments of a passenger car seat moving and tilting system shown in FIGS. 3 to 6, link arms 68 on each side are arranged to pivot about respective pivot points 69 lying behind the connection 73, as shown by the position 70 of the link arm 68, represented by chain lines. The travel of collar pins 72 mounted in slots 71 in the link arm 68 along these slots backwardly from the position shown in FIG. 7 assists the possibility of horizontal adjustment of the position of the front seat 1 for use, employing the adjusting and locking rail 5; a section of the slot 71 forward from the position of the connection 73 shown in FIG. 7, as shown, also assists in this. The remaining section of the slot up to the end position 75 is employed for further forward travel in the slots 71 and for tilting the front seat higher about the supporting and locking stand 10.

The collar pins 72 are fitted securely to the frame 3, and in the region of these pins outside the link arm 68 travellers 77 are fixed to them that are mounted in adjusting rails 78 and thereby secure the front seat 1 against moving upwards or sideways in its position of use. To reach the forward raised position, corresponding to position 14 shown in FIG. 2, the adjusting rails 78 have openings 79 on top at the front through which the travellers 77 pass for tilting up. Likewise these travellers pass back into the adjusting rails through these openings on moving the front seat back into its position of use.

In the embodiment shown in FIGS. 7 and 8 the position 70 of the link arm 68 and the position of the collar pin 72 can again be secured in the end position 75 by retaining means such as resilient clips or the like that automatically engage and disengage during the tilting.

The invention is also applicable in the same way in the case of front seats whose front support and axial locking is effected bilaterally in adjusting rails, which in this case can either be integral with the rear adjusting rails or be separate adjusting rails seated in front at the side on the floor of the vehicle.

We claim:

1. A tilt-away system for a front seat of a passenger car for permitting the seat to be displaced forward axially of the vehicle from a use position to an intermediate position and then to be tilted forwardly from the intermediate position to an access position for providing improved access to a rear seat of the vehicle, said front seat including a seat frame having a forward end and a rearward end, said system comprising: a supporting and locking stand for supporting said seat frame at its forward end, means supporting said seat frame at its rearward end and including adjusting rails mounted at first and second sides of the front seat, travellers displaceably mounted in said adjusting rails for fore-and-aft movement axially of the vehicle, and pivot means pivotably connecting said rearward end of the seat frame to said travellers at said first and second sides of the front seat, said pivot means including link arms each having a front region and a rear region and which, in the position of use of the front seat, lie generally horizontal and extend rearwardly, pivot pins which pivotably connect said link arms in their rear regions to said seat frame, and pivot axles which pivotably connect said link arms in their front regions to said travellers and which define a pivot axis for said link arms, first stop means located in the path of travel of one of said travellers to be engaged by one of said travellers when said front seat is moved to said intermediate position for causing subsequent pivoting of the link arms upwardly about said pivot axis with continued forward movement of the front seat, whereby the front seat is tilted forward relative to said adjusting rails from said intermediate position to said access position, second stop means in the path of travel of at least one of said link arms for limiting the pivoting of said one link arm in such a way that when said front seat is in said access position, said pivot pins lie forward of a vertical plane that extends through the pivot axis defined by said pivot axles, and locking means for each link arm and including a locking pin fixed to one of said travellers, a pivot pin on said seat frame, and a hook mounted to said seat frame by said pivot pin and pivotable about said pivot pin and adapted to hook around said locking pin when said front seat is in said use position for locking said link arm.

2. Tilt-away system for a front seat of a passenger car according to claim 1, characterised in that connections (55) of the frame (3) are made to second link members (63) that are fitted pivotably to the link arms or first link members of the resulting double linkage (58), means for locking with travellers (56) being provided for the use position of the connections (55), and in that by tilting the front seat (1) up into position (14) both the first and second link members (59, 63) of the linkage reach the end position (61) and the connections (55) reach the highest position (66), these positions being overridably locked by resilient retaining means.

3. A tilt-away system for a front seat of a vehicle for permitting the front seat to be displaced forward axially of the vehicle from a use position to an intermediate position and then to be tilted forwardly from the intermediate position to an access position for providing improved access to a rear seat of the vehicle, wherein the front seat includes a seat frame having a forward end and a rearward end, said tilt-away system comprising: front support means including means for supporting the forward end of the seat frame; mounting means including travellers displaceably mounted in adjusting rails at each side of the front seat for mounting the front seat so as to be displaceable axially of the vehicle from said position of use to said intermediate position, said adjusting rails having a forward end and a rearward end, means for connecting the rearward end of the seat frame to said travellers and including a pivot assembly for each of the travellers, each pivot assembly including a link arm having a front region and a rear region, a pivot axle connecting said front region of said link arm to one of said travellers, pivot means including a pivot member pivotally connecting said rear region of said link arm to said seat frame, said link arm extending generally horizontally with its rear region located rearwardly of its front region when the front seat is in said use position, said travellers being moved to a position near the forward end of said adjusting rails, locating said pivot axis near the forward end of said adjusting rails when said front seat is moved forward axially of the vehicle to said intermediate position; first stop means cooperating with at least one of the travellers when said front seat is moved to said intermediate position to cause said link arm to pivot about a pivot axis defined by said pivot axle to an end position, tilting said front seat forwardly relative to said adjusting rails to said access position; and second stop means cooperating with said link arm for limiting the travel of said link arm in such a way that, at its end position, said pivot member lies forward of a vertical axis which extends through the pivot axis defined by said pivot axle.

4. The tilt-away system according to claim 3, wherein a linking means includes said link arm, said link arm being a first link arm having a first end pivotally mounted to one of said travellers and a second end, and a second link arm having a first end pivotally connected to said second end of said first link arm and a second end pivotally connected to said frame, and means for locking said first link arm with one of said travellers for the use position of the seat, and wherein by moving the front seat forwardly and tilting the front seat upwardly toward said access position, said first and second link arms reach raised end positions with the point of connection of the frame to said second link arm being at the highest position.

5. A tilt-away system for a front seat of a vehicle for permitting the front seat to be displaced forward axially of the vehicle from a use position to an intermediate position and then to be tilted forwardly from the intermediate position to an access position for providing improved access to a rear seat of the vehicle, said front seat including a seat frame having a forward end and a rearward end, said system comprising: front support means including means for supporting the forward end of the seat frame; mounting means including travellers displaceably mounted in rails at each side of the front seat for mounting the front seat so as to be displaceable axially of the vehicle from said position of use to said intermediate position; rear support means for connecting the rearward end of the seat frame to said travellers, said rear support means including a pivot assembly for each of the travellers, each pivot assembly including a link arm having a front region and a rear region, a first pivot axle connecting said link arm to one of said travellers in said front region of said link arm and a pivot pin pivotally connecting said link arm to said seat frame in said rear region of said link arm, said link arm extending horizontally with the rear region of the link arm being located rearwardly of the forward end of the link arm when the front seat is in said use position, said front seat being movable forward axially of the vehicle to a position that is intermediate said use and access positions; first stop means cooperating with one of the travellers when said front seat is moved to said intermediate position for causing said link arm to pivot about a pivot axis defined by said pivot axle to an end position whereby the front seat is tilted forward relative to said adjustment rails from said intermediate position to said access position; second stop means cooperating with said link arm for limiting the travel of said link arm in such a way that, at its end position, said pivot pin lies forward of a vertical plane that extends through the pivot axis of said link arm defined by said pivot axle; and locking means including a hook pivotally mounted to the frame and adapted to engage said traveller for locking the seat frame to said traveller when said front seat is in the use position.

6. The tilt-away system according to claim 5, including further locking means for locking the forward end of the seat frame to said front support means.

7. The tilt-away system according to claim 5, wherein a linking means includes said link arm, said link arm being a first link arm having a first end pivotally mounted to one of said travellers and a second end, and a second link arm having a first end pivotally connected to said second end of said first link arm and a second end pivotally connected to said frame, and means for locking said first link arm with one of said travellers for the use position of the seat, and wherein by moving the front seat forwardly and tilting the front seat upwardly toward said access position, said first and second link arms reach raised end positions with the point of connection of the frame to said second link arm being at the highest position.

* * * * *